United States Patent
Chen (10) Patent No.: US 12,495,417 B2
(45) Date of Patent: Dec. 9, 2025

(54) METHOD FOR DETERMINING UPLINK TRANSMISSION PARAMETER, AND TERMINAL DEVICE

(71) Applicant: GUANGDONG OPPO MOBILE TELECOMMUNICATIONS CORP., LTD., Dongguan (CN)

(72) Inventor: Wenhong Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 370 days.

(21) Appl. No.: 18/090,378

(22) Filed: Dec. 28, 2022

(65) Prior Publication Data

US 2023/0262696 A1 Aug. 17, 2023

Related U.S. Application Data

(63) Continuation of application No. PCT/CN2020/101907, filed on Jul. 14, 2020.

(51) Int. Cl.
*H04W 72/1268* (2023.01)
*H04W 16/28* (2009.01)
*H04W 72/23* (2023.01)

(52) U.S. Cl.
CPC ....... *H04W 72/1268* (2013.01); *H04W 16/28* (2013.01); *H04W 72/23* (2023.01)

(58) Field of Classification Search
CPC . H04W 72/23; H04W 16/28; H04W 72/1268; H04W 72/0453; H04W 72/232;
(Continued)

(56) References Cited

U.S. PATENT DOCUMENTS

2018/0343653 A1 11/2018 Guo
2019/0364561 A1 11/2019 Xiong et al.
(Continued)

FOREIGN PATENT DOCUMENTS

CN 110120862 A 8/2019
CN 110475360 A 11/2019
(Continued)

OTHER PUBLICATIONS

First Office Action issued in corresponding Japanese application No. 2023-501676, mailed May 7, 2024.
(Continued)

*Primary Examiner* — Andrew Lee
(74) *Attorney, Agent, or Firm* — BAYES PLLC (57) ABSTRACT

Provided are a method for determining an uplink transmission parameter, and a terminal device. When a PUCCH resource with the lowest resource identifier in an uplink BWP activated on a carrier where a PUSCH is located is configured with a plurality of sets of transmission parameters, the terminal device can determine a transmission parameter of the PUSCH scheduled by means of a DCI format 0_0. The method for determining an uplink transmission parameter comprises: according to a transmission parameter of a PUCCH resource in an uplink BWP activated on a carrier where a PUSCH is located, determining a transmission parameter of the PUSCH, wherein the PUSCH is a PUSCH scheduled by using a first DCI format, and the transmission parameter is a transmission beam and/or the transmission parameter is a reference signal used for path loss measurement.

18 Claims, 4 Drawing Sheets

(58) Field of Classification Search
CPC . H04B 7/06952; H04L 5/0023; H04L 5/0053; H04L 5/001
See application file for complete search history.

(56) References Cited

U.S. PATENT DOCUMENTS

| | | | | |
|---|---|---|---|---|
| 2020/0322893 | A1* | 10/2020 | Yao | H04W 56/001 |
| 2021/0204276 | A1* | 7/2021 | Ge | H04L 1/1861 |
| 2021/0314952 | A1* | 10/2021 | Taherzadeh Boroujeni | H04W 72/53 |
| 2021/0336664 | A1* | 10/2021 | Yang | H04B 7/0456 |
| 2021/0368482 | A1* | 11/2021 | Sakhnini | H04W 72/23 |
| 2023/0028861 | A1* | 1/2023 | Yao | H04W 52/54 |
| 2023/0089446 | A1* | 3/2023 | Yao | H04B 7/0695 370/329 |
| 2023/0096215 | A1* | 3/2023 | Cao | H04L 5/0053 370/329 |
| 2023/0144956 | A1* | 5/2023 | Chen | H04L 5/0053 370/329 |
| 2023/0164779 | A1* | 5/2023 | Chung | H04L 5/00 370/329 |
| 2023/0224866 | A1* | 7/2023 | Hakola | H04W 72/02 370/329 |
| 2023/0300812 | A1* | 9/2023 | Li | H04L 5/0094 370/330 |

FOREIGN PATENT DOCUMENTS

| | | |
|---|---|---|
| CN | 110611956 A | 12/2019 |
| CN | 110913490 A | 3/2020 |
| CN | 111083773 A | 4/2020 |
| CN | 111092697 A | 5/2020 |
| CN | 111277395 A | 6/2020 |
| CN | 111316739 A | 6/2020 |
| CN | 111726213 A | 9/2020 |
| WO | 2020035718 A1 | 2/2020 |

OTHER PUBLICATIONS

Priority Review issued in corresponding Chinese application No. 202310127377.2, mailed May 30, 2024.
First Office Action issued in corresponding Chinese application No. 202310127377.2, mailed Jun. 5, 2024.
Source: LG Electronics; Title: Feature lead summary#3 of Enhancements on Multi-beam Operations 3GPP TSG RAN WG1 Meeting #99 R1-1913422 Reno, USA, Nov. 18-22, 2019.
Source: CATT; Title: On multi-TRP/panel transmission 3GPP TSG RAN WG1 Meeting #97 R1-1906345 Reno, USA, May 13-17, 2019.
MediaTek Inc., "Remaining issues on multi-beam operation", R1-2001823, 3GPP TSG RAN WG1 #100bis e-Meeting, Apr. 20-30, 2020.
International Search Report issued in International application No. PCT/CN2020/101907, mailed Mar. 30, 2021.
Written Opinion of the International Searching Authority issued in International application No. PCT/CN2020/101907, mailed Mar. 30, 2021.
NTT DOCOMO, Inc, "Enhancements on multi-TRP/panel transmission", R1-1902812, 3GPP TSG RAN WG1 #96 Athens, Greece, Feb. 25-Mar. 1, 2019.
Nokia et al., "Corrections on NR enhanced MIMO", R1-2003146, 3GPP TSG-RAN WG1 Meeting #100b-e e-Meeting, Apr. 20-30, 2020.
ZTE, "Maintenance of enhancements on multi-beam operation", R1-2001597, 3GPP TSG RAN WG1 Meeting #100bis-e e-Meeting, Apr. 20-Apr. 30, 2020.
Notice of Grant of Invention Patent Right issued in corresponding Chinese Application No. 202310127377.2, dated Aug. 9, 2024, 6 pages.
Decision of Refusal issued in corresponding Japanese Application No. 2023-501676, dated Oct. 8, 2024, 8 pages.
Extended European Search Report issued in corresponding European application No. 20945665.6, mailed Jun. 20, 2023.
OPPO, "Discussion on Multi-beam Operation Enhancements", R1-1910117, 3GPP TSG RAN WG1 #98bis Chongqing, China, Oct. 14-20, 2019.
OPPO, "Text proposals for enhancements on multi-TRP and panel", R1-2004047, 3GPP TSG RAN WG1 #101 e-Meeting, May 25-Jun. 5, 2020.
LG Electronics, "Feature lead summary#5 of Enhancements on Multi-beam Operations", R1-1911593, 3GPP TSG RAN WG1 Meeting #98bis Chongqing, China, Oct. 14-20, 2019.
Request for the Submission of an Opinion issued in corresponding Korean Application No. 10-2023-7004064, mailed on Jun. 24, 2025, 10 pages.
Remaining Issues on Multi-beam operation, Agenda Item: 7.2.6.3, Source: Apple Inc., 3GPP TSG RAN WG1 #101 R1-2004230, e-Meeting, May 25-Jun. 5, 2020, 12 pages.
Discussion on multi-beam enhancement, Source: NTT Docomo, Inc., Agenda Item: 7.2.8.3, 3GPP TSG RAN WG1 #98bis, R1-1911185, Chongqing, China, Oct. 14-20, 2019, 20 pages.

* cited by examiner

METHOD FOR DETERMINING UPLINK TRANSMISSION PARAMETER, AND TERMINAL DEVICE

CROSS-REFERENCE TO RELATED APPLICATION

This application is a continuation of PCT Application No. PCT/CN2020/101907, filed Jul. 14, 2020, the entire contents of which are incorporated herein by reference.

TECHNICAL FIELD

The embodiments of the present application relate to the field of communications, and more particularly, to a method for determining an uplink transmission parameter and a terminal device.

BACKGROUND

In the New Radio (NR) system, for the Physical Uplink Shared Channel (PUSCH) scheduled by Downlink Control Information (DCI) format 0_0, the terminal device may use a sending beam on the PUCCH resource with the lowest resource identifier in the uplink Band Width Part (BWP) activated on the carrier where the PUSCH is located as the sending beam of the PUSCH.

In order to improve the transmission reliability of PUCCH, PUCCH diversity transmission based on multiple Transmission/Reception Points (TRPs) is introduced, and the terminal device can repeatedly transmit the same PUCCH using the same PUCCH resource and different transmission parameters (such as sending beam and power control parameters) in different slots. In the scenario of PUCCH diversity transmission of multiple TRPs, the PUCCH resource with the lowest resource identifier in the uplink BWP activated on the carrier where the PUSCH is located may be configured with multiple spatial relation information (i.e. a plurality of sending beams). At this time, PUSCH may only transmit a single TRP (i.e. only a single beam can be used for transmission). In this case, how to determine the transmission parameter (such as the sending beam) of the PUSCH scheduled by DCI format 0_0 is an urgent problem to be solved.

SUMMARY

The embodiments of the present application provide a method for determining an uplink transmission parameter and a terminal device. In the case where the PUCCH resource with the lowest resource identifier in the uplink BWP activated on the carrier where the PUSCH is located is configured with a plurality groups of transmission parameters, the terminal device can determine the transmission parameter of the PUSCH scheduled by DCI format 0_0.

In a first aspect, a method for determining an uplink transmission parameter is provided, the method including:
  determining, by a terminal device, a transmission parameter of a PUSCH according to a transmission parameter on a PUCCH resource in an uplink BWP activated on a carrier where the PUSCH is located, where the PUSCH is a PUSCH scheduled by using a first DCI format, and the transmission parameter is a sending beam and/or the transmission parameter is a reference signal used for path loss measurement.
  Optionally, the first DCI format is DCI format 0_0.

In a second aspect, a terminal device is provided for executing the method in the above-mentioned first aspect.
  Specifically, the terminal device includes functional modules for executing the method in the first aspect.

In a third aspect, a terminal device is provided, including a processor and a memory. The memory is configured to store a computer program, and the processor is configured to call and run the computer program stored in the memory to execute the method in the first aspect.

In a fourth aspect, an apparatus is provided for implementing the method in the above-mentioned first aspect.
  Specifically, the apparatus includes: a processor for invoking and running a computer program from a memory, so that a device in which the apparatus is installed executes the method in the above-mentioned first aspect.

In a fifth aspect, a computer-readable storage medium is provided for storing a computer program, and the computer program causes a computer to execute the method in the above-mentioned first aspect.

In a sixth aspect, a computer program product is provided, including computer program instructions, the computer program instructions causing a computer to execute the method of the above-mentioned first aspect.

In a seventh aspect, there is provided a computer program which, when run on a computer, causes the computer to execute the method of the above-mentioned first aspect.

Through the above technical solutions, when the PUCCH resource with the lowest resource identifier in the uplink BWP activated on the carrier where the PUSCH is located is configured with a plurality groups of transmission parameters, the terminal device can determine the transmission parameter of the PUSCH scheduled by DCI format 0_0.

DETAILED DESCRIPTION

The technical solutions in the embodiments of the present application will be described below with reference to the accompanying drawings in the embodiments of the present application. Obviously, the described embodiments are part of the embodiments of the present application, not all of the embodiments. With regard to the embodiments in the present application, all other embodiments obtained by persons of ordinary skill in the art without creative efforts shall fall within the protection scope of the present application.

The technical solutions of the embodiments of the present application can be applied to various communication systems, for example: a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an Advanced Long Term Evolution (LTE-A) system, a New Radio (NR) system, an evolution system of NR system, an LTE-based access to unlicensed spectrum (LTE-U) system on an unlicensed spectrum, an NR-based access to unlicensed spectrum (NR-U) system, a Non-Terrestrial Networks (NTN) system, a Universal Mobile Telecommunication System (UMTS), Wireless Local Area Networks (WLAN), Wireless Fidelity (WiFi), a fifth-generation communication (5th-Generation, 5G) system or other communication systems, etc.

Generally speaking, traditional communication systems support a limited number of connections, which is easy to be implemented. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc. The embodiments of the present application can also be applied to these communication systems.

Optionally, the communication system in the embodiments of the present application may be applied to a Carrier Aggregation (CA) scenario, a Dual Connectivity (DC) scenario, or a Standalone (SA) network layout scene.

Optionally, the communication system in the embodiments of the present application may be applied to an unlicensed spectrum, where the unlicensed spectrum may also be considered as a shared spectrum; or, the communication system in the embodiments of the present application may also be applied to a licensed spectrum, where the licensed spectrum may also be considered as an unshared spectrum.

The embodiments of the present application describe various embodiments in conjunction with the network device and the terminal device, where the terminal device may also be referred to as User Equipment (UE), an access terminal, a subscriber unit, a subscriber station, a mobile station, a mobile, a remote station, a remote terminal, a mobile device, a user terminal, a terminal, a wireless communication device, a user agent or a user apparatus, etc.

The terminal device may be a station (STAION, ST) in the WLAN, may be a cellular phone, a cordless phone, a Session Initiation Protocol (SIP) phone, a Wireless Local Loop (WLL) station, a Personal Digital Assistant (PDA) device, handheld devices with wireless communication capabilities, computing devices or other processing devices connected to wireless modems, in-vehicle devices, wearable devices, next-generation communication systems such as terminal devices in NR networks, or terminal devices in the future evolved Public Land Mobile Network (PLMN) network, etc.

In the embodiments of the present application, the terminal device may be deployed on land, including indoor or outdoor, handheld, wearable, or vehicle-mounted; it may also be deployed on water (such as ships, etc.); it may also be deployed in the air (such as airplanes, balloons, and satellites).

In the embodiments of the present application, the terminal device may be a Mobile Phone, a tablet computer (Pad), a computer with a wireless transceiver function, a Virtual Reality (VR) terminal device, and an Augmented Reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city or a wireless terminal device in smart home, etc.

As an example and not a limitation, in the embodiments of the present application, the terminal device may also be a wearable device. The wearable device may also be called a wearable smart device, which is the general term for devices that may be worn and obtained by the intelligent design and the development of daily wear using wearable technology, such as glasses, gloves, watches, clothing and shoes. The wearable device is a portable device that is worn directly on the body or integrated into the user's clothing or accessories. The wearable device is not only a hardware device, but also realizes powerful functions through software support, data interaction, and cloud interaction. In a broad sense, the wearable smart device includes devices having full function, large size and realizing complete or partial functions without relying on the smart phone, such as smart watches or smart glasses, and devices only focusing on a certain type of application function and needing to be used by cooperating with other devices such as the smart phone, such as all kinds of smart bracelets, smart jewelry, etc. for physical sign monitoring.

In the embodiments of the present application, the network device may be a device for communicating with a mobile device, and the network device may be an Access Point (AP) in WLAN, or a Base Transceiver Station (BTS) in GSM or CDMA, it may also be a NodeB (NB) in WCDMA, it may also be an Evolutional Node B (eNB or eNodeB) in LTE, or a relay station or access point, or an in-vehicle device, a wearable device and a network device or a base station (gNB) in the NR network or a network device in the future evolved PLMN network or a network device in the NTN network, etc.

As an example and not a limitation, in the embodiments of the present application, the network device may have a mobile characteristic, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a High Elliptical Orbit (HEO) satellite, etc. Optionally, the network device may also be a base station set in a location such as land or water.

In the embodiments of the present application, the network device may provide services for a cell, and the terminal device communicates with the network device through transmission resources (for example, frequency domain resources, or spectrum resources) used by the cell. The cell may be a cell corresponding to the network device (for example, the base station). The cell may belong to the macro base station, or it may belong to the base station corresponding to the Small cell. The Small cell here may include a Metro cell, a Micro cell, a Pico cell, a Femto cell, etc. These Small cells have the characteristics of small coverage and low transmit power, and are suitable for providing high-speed data transmission services.

Figure 1:
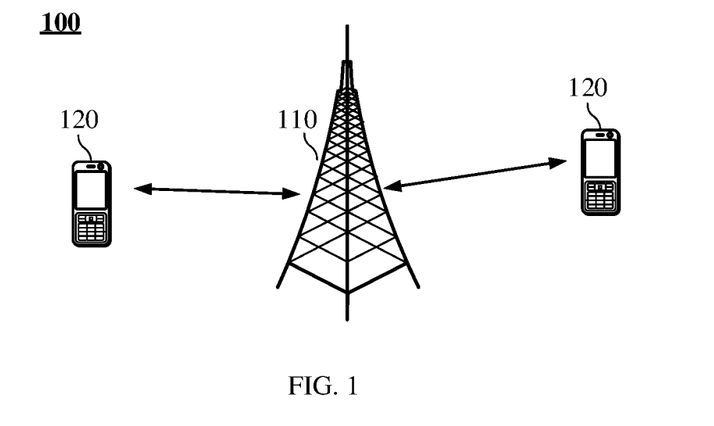
FIG. 1 is a schematic diagram of a communication system architecture to which the embodiments of the present application are applied.

Exemplarily, a communication system 100 to which the embodiments of the present application is applied is shown in FIG. 1. The communication system 100 may include a network device 110, and the network device 110 may be a device that communicates with a terminal device 120 (or referred to as a communication terminal, a terminal). The network device 110 may provide communication coverage for a particular geographic area, and may communicate with the terminal devices located within the coverage area.

FIG. 1 exemplarily shows one network device and two terminal devices. Optionally, the communication system 100 may include a plurality of network devices and the coverage of each network device may include other numbers of terminal devices, which is not limited by the embodiments of the present application.

Optionally, the communication system 100 may further include other network entities such as a network controller and a mobility management entity, which are not limited in the embodiments of the present application.

It should be understood that, in the embodiments of the present application, a device having a communication function in the network/system may be referred to as a communication device. Taking the communication system 100 shown in FIG. 1 as an example, the communication device may include a network device 110 and a terminal device 120 with a communication function, and the network device 110 and the terminal device 120 may be the specific devices described above, which will not be repeated here. The communication device may also include other devices in the communication system 100, such as other network entities such as a network controller, a mobility management entity, etc., which are not limited in the embodiments of the present application.

It should be understood that the terms "system" and "network" are often used interchangeably herein. The term "and/or" in the present disclosure is only an association relationship to describe the associated objects, indicating that there may be three kinds of relationships, for example, A and/or B may mean the following three relationships: A exists alone, A and B exist at the same time, and B exists alone. In addition, the character "/" in the present disclosure generally indicates that the related objects are in an "or" relationship.

It should be understood that the "indicating" mentioned in the embodiments of the present application may be a direct indication, an indirect indication, or an associated relationship. For example, if A indicates B, it may mean that A directly indicates B, for example, B may be obtained through A; or it may also mean that A indicates B indirectly, such as A indicates C, and B may be obtained through C; or it may also mean that there is an associated relationship between A and B.

In the description of the embodiments of the present application, the term "corresponding" may indicate that there is a direct or indirect corresponding relationship between the two things, or may indicate that there is an associated relationship between the two things, or may indicate a relationship such as indicating and be indicated, configuring and be configured.

In the NR system, the terminal device may use analog beams to transmit uplink data and uplink control information. The terminal device may perform uplink beam management based on a Sounding Reference Signal (SRS) signal, so as to determine the analog beam used for uplink transmission. Specifically, the network device may configure an SRS resource set for the terminal device, select one SRS resource with the best reception quality based on the SRSs transmitted by the terminal device in the SRS resource set, and notify the corresponding SRS resource indicator (SRI) to the terminal device. After receiving the SRI, the terminal device determines the analog beam used by the SRS resource indicated by the SRI as the analog beam used for transmitting the Physical Uplink Shared Channel (PUSCH). For the PUSCH scheduled by DCI, the SRI is indicated by the SRI indication field in the DCI; for the PUSCH scheduled by Radio Resource Control (RRC), the SRI is notified by corresponding scheduling signaling. If the DCI used to schedule the PUSCH is DCI format 0_0, the DCI does not contain SRI, and the terminal device uses a sending beam on the PUCCH resource with the lowest resource identifier (ID) in the Physical Uplink Control Channel (PUCCH) configured with spatial relation information on the activated Band Width Part (BWP) of a carrier where the PUSCH is located, as the sending beam of the PUSCH. At the same time, the terminal device uses the path loss measurement reference signal of the PUCCH as the path loss measurement reference signal of the PUSCH. If there is no PUCCH resource configured on the activated BWP on the carrier where the PUSCH scheduled by the DCI format 0_0 is located, or if the PUCCH resource configured on the activated BWP on the carrier where the PUSCH is located does not configured with the spatial relation information, the terminal device may obtain the sending beam and the path loss measurement reference signal of the PUSCH according to a Quasi-co-located (QCL) assumption (QCL type D) used by the CORESET with the lowest ID in the activated downlink BWP on the carrier. For example, the receiving beam of the downlink reference signal included in the QCL assumption may be used as the sending beam of the PUSCH, and the downlink reference signal may be used as the path loss measurement reference signal of the PUSCH.

For PUCCH, a similar method is used to indicate the beam used. Specifically, for each PUCCH resource, a plurality of PUCCH spatial relation information (PUCCH-spatial relationinfo) are configured in the RRC signaling, and then the currently used PUCCH-spatialrelationinfo is indicated therefrom through the Media Access Control (MAC) layer signaling. Each PUCCH-spatialrelationinfo includes one reference signal used to determine the sending beam of the PUCCH, which may be an SRS or a Channel State Information Reference Signal (CSI-RS) or a Synchronization Signal Block (SSB). The PUCCH-spatialrelationinfo may also include a power control parameter corresponding to the PUCCH. For each SRS resource, corresponding SRS spatial relation information (SRS-spatialrelationinfo) may also be configured through RRC signaling, which includes one reference signal used to determine the sending beam of the SRS. If PUCCH-spatialrelationinfo is not configured on the network side, the terminal device may use a method similar to PUSCH, and obtain the sending beam of the PUCCH according to the QCL assumption (QCL Type D) used by the Control Resource Set (CORESET) with the lowest ID in the downlink BWP activated on the carrier where the PUCCH is located. For example, the receiving beam of the downlink reference signal included in the QCL assumption may be used as the sending beam of the PUCCH.

In the NR system, the network device may configure a corresponding Transmission Configuration Indicator (TCI) state for each downlink signal or downlink channel, indicating the QCL reference signal corresponding to a target downlink signal or a target downlink channel, so that the terminal performs the reception of the target downlink signal or the target downlink channel based on the reference signal.

One TCI state may contain the following configurations:
TCI state ID, used to identify one TCI state;
QCL information 1;
QCL information 2.
One QCL information also includes the following information:
QCL type configuration, which may be one of QCL type A, QCL type B, QCL type C, and QCL type D;
QCL reference signal configuration, including the ID of the cell where the reference signal is located, the BWP ID, and the identifier of the reference signal (which may be a CSI-RS resource ID or an SSB index).

The QCL type of at least one of QCL information 1 and QCL information 2 must be one of typeA, typeB, and typeC, and the QCL type of the other QCL information (if configured) must be QCL type D.

Among them, the definitions of different QCL type configurations are as follows:
'QCL-TypeA': {Doppler shift, Doppler spread, average delay, delay spread};
'QCL-TypeB': {Doppler shift, Doppler spread};
'QCL-TypeC': {Doppler shift, average delay};
'QCL-TypeD': {Spatial Rx parameter}.

If the network device configures the QCL reference signal of the target downlink channel as the reference SSB or reference CSI-RS resource through the TCI state, and the QCL type is configured as typeA, typeB or typeC, the terminal device may assume that the target large-scale parameter of the target downlink channel is the same as that of the reference SSB or the reference CSI-RS resource, so that the same corresponding reception parameter is used for reception, and the target large-scale parameter is determined by the QCL type configuration. Similarly, if the network device configures the QCL reference signal of the target downlink channel as a reference SSB or a reference CSI-RS resource through the TCI state, and the QCL type is configured as type D, then the terminal device may use the receiving beam (that is, the Spatial Rx parameter) that is the same as the receiving beam for receiving the reference SSB or the reference CSI-RS resource to receive the target downlink channel Generally, the target downlink channel and its reference SSB or reference CSI-RS resource are sent by the same TRP or the same antenna panel or the same beam on the network side. If the transmission TRPs, transmission panels or sending beams of the two downlink signals or downlink channels are different, different TCI states are usually configured.

Figure 2:
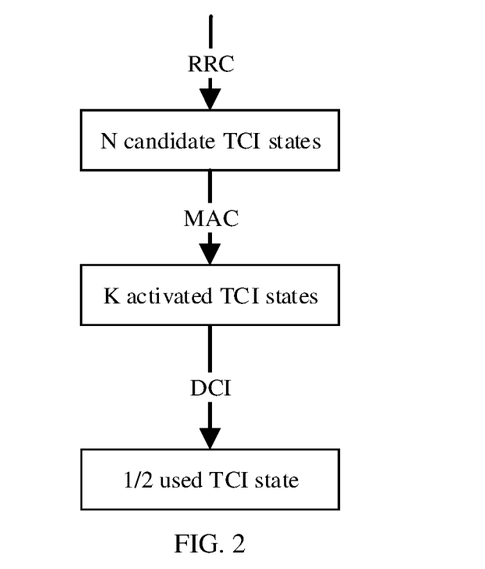
FIG. 2 is a schematic diagram of a TCI state configuration of a PDSCH provided by the present application.

For the downlink control channel, the TCI state may be indicated by means of RRC signaling or RRC signaling+ MAC signaling. For the downlink data channel, the available TCI state set is indicated by RRC signaling, and some of the TCI states are activated by MAC layer signaling, and finally one or two TCI states are indicated from the activated TCI states by the TCI state indication field in the DCI, for the PDSCH scheduled by the DCI. For example, as shown in FIG. 2, the network device indicates N candidate TCI states through RRC signaling, activates K TCI states through MAC signaling, and finally indicates 1 or 2 TCI states used from the activated TCI states through the TCI state indication field in DCI.

Figure 3:
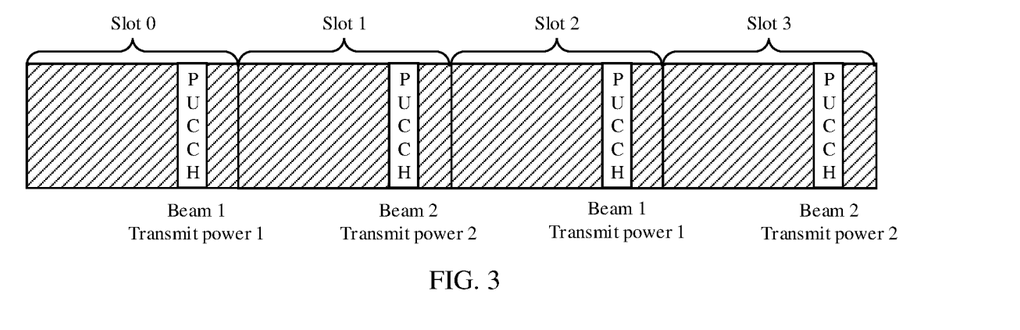
FIG. 3 is a schematic diagram of a PUCCH repeated transmission provided by the present application.
Figure 4:
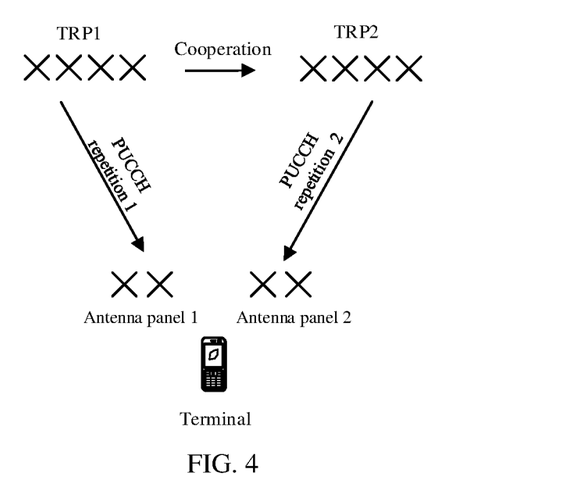
FIG. 4 is a schematic diagram of a multi-TRP-based PUCCH diversity transmission provided by the present application.

In order to meet the transmission delay and reliability requirements of the Physical Downlink Shared Channel (PDSCH), Release 16 (Rel-16) introduces a multi-transmission/reception point (TRP) based PDSCH diversity transmission, and data transmitted by different TRPs is received by Frequency-division multiplexing (FDM), time division multiplexing mode (Testing Data Management/Technical Data Management, TDM) or Space Division Multiplexing (SDM). A similar mechanism may also be used for PUCCH transmission to improve the transmission reliability of PUCCH. Specifically, the terminal device may use the same PUCCH resource in different slots to repeatedly transmit the same PUCCH (carrying the same Uplink Control Information (UCI)). Since the PUCCHs in different slots are sent to different TRPs, the used sending beams and power control parameter (such as the path loss measurement reference signal) are also configured independently, as shown in FIG. 3. For example, N pieces of spatial relation information PUCCH-spatialrelationinfo or N TCI states may be indicated for one PUCCH resource, which are respectively used for repeated transmission of PUCCH in different slots, and the sending beam and power control parameter of PUCCH may be obtained from the N pieces of spatial relation information PUCCH-spatialrelationinfo or N TCI states. Among them, N is the number of cooperative TRPs, and for the case of two TRPs, N=2, as shown in FIG. 4.

In the embodiments of the present application, the transmit power of the PUSCH may be calculated by the following formula 1:

$$P_{PUSCH,b,f,c}(i, j, q_d, l) = \min\left\{\begin{array}{l} P_{CMAX,f,c}(i), \\ P_{O\_PUSCH,b,f,c}(j) + 10\log_{10}(2^\mu \cdot M_{PB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{array}\right\}$$

Among them, in formula 1, $P_{CMAX,f,c}(i)$ is the maximum transmit power on the current carrier of the terminal, i is an index of one PUSCH transmission, j is an open-loop power control parameter index (including a target power $P_{O\_PUSCH,b,f,c}(j)$ and a path loss factor $\alpha_{b,f,c}(j)$); $q_d$ is an index of the reference signal used for path loss measurement, used to obtain the path loss value $PL_{b,f,c}(q_d)$, and is also an open-loop power control parameter; $f_{b,f,c}(i,l)$ is a closed-loop power control adjustment state, where l is an index of the closed-loop power control adjustment state. The terminal determines the closed-loop power adjustment factor according to a Transmission Power Control (TPC) command field sent by the network side, and the TPC command field may be carried by the DCI used for scheduling the PUSCH in the terminal search space, or it may be carried by DCI format 2_2 for carrying the group TPC command field in the common search space. The closed-loop power control adjustment states corresponding to different closed-loop power control adjustment state indexes are independently calculated, so that different PUSCH transmit powers can be obtained.

Since the multi-TRP-based PUCCH diversity transmission is introduced, the terminal device may repeatedly transmit the same PUCCH using the same PUCCH resource and different transmission parameters (such as sending beam and power control parameter) in different slots. If the PUCCH resource with the lowest PUCCH resource ID on the activated BWP of the carrier where the PUSCH is located is configured with a plurality of pieces of spatial relation information (such as a plurality of beams), how to determine the beam and path loss measurement reference signal of the PUSCH scheduled by DCI format 0_0 is an urgent problem to be solved.

Based on the above problems, the present application proposes a scheme for determining an uplink transmission parameter. If the PUCCH resource with the lowest PUCCH resource ID in the uplink BWP activated on the carrier where the PUSCH is located is configured with a plurality groups of transmission parameters (sending beam and/or path loss measurement reference signal), the terminal device may determine the transmission parameter (sending beam and/or path loss measurement reference signal) of the PUSCH based on the solution of the present application. Specifically, the terminal device may select other PUCCH resources that are not configured with a plurality pieces of spatial relation information to obtain the transmission parameter of PUSCH, or use the transmission parameter of PUCCH sent to the same TRP as the transmission parameter of PUSCH, or obtain the transmission parameter of PUSCH from the QCL assumption of the downlink signal, so that the problem of inability to determine PUSCH transmission parameter can be solved without signaling.

The technical solutions of the present application are described in detail below through specific embodiments.

Figure 5:
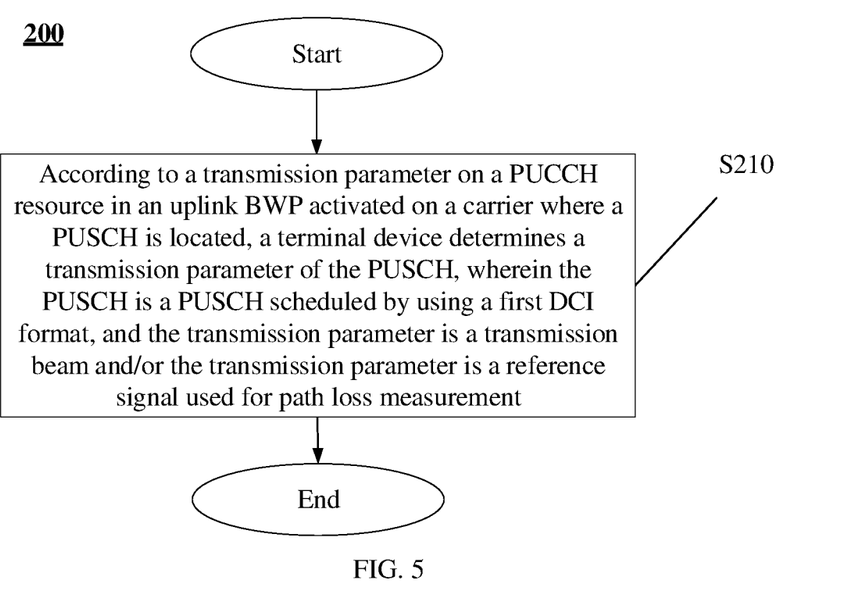
FIG. 5 is a schematic flowchart of a method for determining an uplink transmission parameter according to an embodiment of the present application.

FIG. 5 is a schematic flowchart of a method 200 for determining an uplink transmission parameter according to an embodiment of the present application. As shown in FIG. 5, the method 200 may include at least part of the following contents.

In S210, the terminal device determines a transmission parameter of the PUSCH according to a transmission parameter on a PUCCH resource in the uplink BWP activated on a carrier where the PUSCH is located, where the PUSCH is a PUSCH scheduled by using the first DCI format, and the transmission parameter is a sending beam and/or the transmission parameter is a reference signal used for path loss measurement.

Optionally, the first DCI format is DCI format 0_0.

It should be noted that the DCI format 0_0 is used for PUSCH scheduling, and the SRS resource indication (SRI) is not included in the DCI format 0_0. For the PUSCH scheduled by some other DCI formats except DCI format 0_0, the network device may configure an SRS resource set for the terminal device, select one SRS with the best reception quality based on the SRSs transmitted by the terminal device in the SRS resource set, and notify the corresponding SRS resource indication (SRI) to the terminal device. After receiving the SRI, the terminal device determines the analog beam used for the SRS resource indicated by the SRI as the analog beam used for transmitting the PUSCH.

That is, for PUSCH scheduled by DCI format 0_0, since DCI format 0_0 does not include SRS resource indication (SRI), the terminal device cannot determine the analog beam used for transmitting PUSCH based on the analog beam used for SRS resource indicated by the SRI.

It should be noted that, in the embodiments of the present application, the sending beam and the reference signal used for the path loss measurement of the PUCCH resource may be obtained through Spatial relation information (for example, PUCCH-spatial relationinfo), or may be obtained through the TCI state. Therefore, the transmission parameter of the PUCCH resource in the embodiments of the present application may refer to the spatial relation information of the PUCCH resource or the TCI state.

In the embodiments of the present application, the sending beam may also be referred to as a Spatial domain transmission filter or a Spatial domain filter for transmission, or a Spatial relation or a spatial setting. The receiving beam may also be called a Spatial domain reception filter or a Spatial domain filter for reception, or a spatial reception parameter (Spatial Rx parameter).

In the embodiments of the present application, the reference signal used for path loss measurement may be a downlink reference signal used for path loss measurement, such as CSI-RS or SSB, and the terminal device may calculate the transmit power of the PUSCH according to the measured path loss value, for example, the transmit power of the PUSCH is calculated based on the above formula 1.

Optionally, in the embodiments of the present application, a plurality of PUCCH resources may be configured in the uplink BWP, and each PUCCH resource may be independently configured with a resource identifier and a transmission parameter of PUCCH (for example, configured through PUCCH spatial relation information). For example, some PUCCH resources are not configured with a sending beam (for example, no PUCCH spatial relation information is configured), some PUCCH resources are only configured with a single sending beam (for example, only one PUCCH spatial relation information is configured), and some PUCCH resources are configured with a plurality of sending beams (for example, a plurality pieces of PUCCH spatial relation information are configured, which are respectively used for transmission of different repetitions). That is to say, in the embodiments of the present application, the multi-TRP-based PUCCH diversity transmission may be used in the uplink BWP.

Optionally, in the embodiments of the present application, S210 may specifically determine the transmission parameter of the PUSCH through one or more of the following solutions in Example 1 to Example 3.

Example 1: the terminal device determines a transmission parameter on a PUCCH resource with the lowest resource identifier among PUCCH resources which are configured with only one group of transmission parameters in an uplink BWP activated on a carrier on which the PUSCH is located, as the transmission parameter of the PUSCH.

Figure 6:
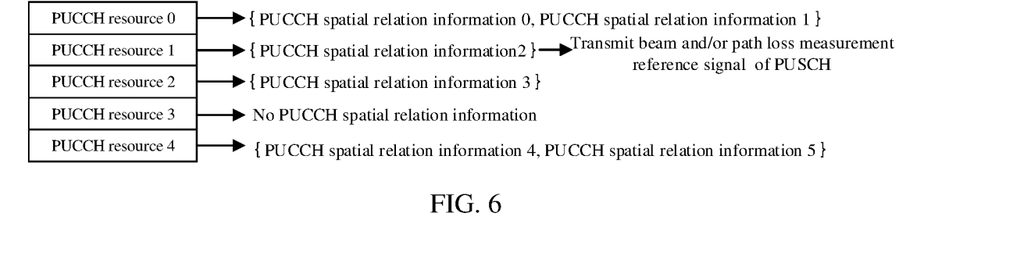
FIG. 6 is a schematic diagram of determining a PUSCH transmission parameter according to an embodiment of the present application.

In Example 1, for example, as shown in FIG. 6, 5 PUCCH resources are configured in the uplink BWP activated on the carrier where the PUSCH is located, which are denoted as PUCCH resource 0, PUCCH resource 1, PUCCH resource 2, PUCCH resource 3 and PUCCH resource 4 respectively, and the PUSCH is scheduled by DCI format 0_0. Among them, PUCCH resource 0 is configured with 2 groups of transmission parameters (such as PUCCH spatial relation information 0 and PUCCH spatial relation information 1), PUCCH resource 1 is configured with 1 group of transmission parameters (such as PUCCH spatial relation information 2), PUCCH resource 2 is configured with 1 group of transmission parameters (such as PUCCH spatial relation information 3), and no transmission parameter is configured on PUCCH resource 3, that is, PUCCH resource 3 has no PUCCH spatial relation information, and PUCCH resource 4 is configured with 2 groups of transmission parameters (such as PUCCH spatial relation information 4 and PUCCH spatial relation information 5). Specifically, the PUCCH resources configured with only one group of transmission parameters includes PUCCH resource 1 and PUCCH resource 2, and the PUCCH resource with the lowest resource identifier in PUCCH resource 1 and PUCCH resource 2 is PUCCH resource 1, then the terminal device may use the transmission parameter of PUCCH resource 1 as the transmission parameter of the PUSCH. For example, the terminal device uses the sending beam of PUCCH resource 1 as the sending beam of the PUSCH. At the same time, the terminal device uses the reference signal used for the path loss measurement of PUCCH resource 1 as the reference signal used for the path loss measurement of the PUSCH.

Therefore, in Example 1, when the multi-TRP-based PUCCH diversity transmission is used in the uplink BWP activated on the carrier where the PUSCH is located, the terminal device may determine the transmission parameter on the PUCCH resource with the lowest resource identifier among the PUCCH resources that are configured with only one group of transmission parameters in the uplink BWP activated on the carrier where the PUSCH is located as the transmission parameter of the PUSCH, thereby avoiding the problem that the PUCCH resource used to obtain the PUSCH transmission parameter has a plurality groups of transmission parameters.

Example 2: if the PUCCH resource with the lowest resource identifier in the uplink BWP activated on the carrier where the PUSCH is located is configured with a plurality groups of transmission parameters, the terminal device determines a target transmission parameter in the plurality groups of transmission parameters as the transmission parameter of the PUSCH.

Optionally, in Example 2, the target transmission parameter is one pre-agreed group of transmission parameters in the plurality groups of transmission parameters, or the target transmission parameter is one pre-configured group of transmission parameters in the plurality groups of transmission parameters, or, the target transmission parameter is one group of transmission parameters indicated by the network device in the plurality groups of transmission parameters.

For example, the PUCCH resource with the lowest resource identifier in the uplink BWP is configured with two groups of transmission parameters, which are respectively used for odd-numbered PUCCH repeated transmission and even-numbered PUCCH repeated transmission. In this case, the terminal device may determine the first group of transmission parameters in the two groups of transmission parameters as the transmission parameter of the PUSCH.

For another example, in this case, the PUCCH resource with the lowest resource identifier in the uplink BWP is configured with two pieces of PUCCH spatial relation information, which are respectively used for odd-numbered PUCCH repeated transmissions and even-numbered PUCCH repeated transmissions. The terminal device may use the sending beam indicated by the first PUCCH spatial relation information as the sending beam of the PUSCH; and use the path loss measurement reference signal indicated by the first PUCCH spatial relation information as the path loss measurement reference signal of the PUSCH. Alternatively, the terminal device may use the sending beam indicated by the second PUCCH spatial relation information as the sending beam of the PUSCH; and use the path loss measurement reference signal indicated by the second PUCCH spatial relation information as the path loss measurement reference signal of the PUSCH.

Optionally, in Example 2, the target transmission parameter is determined from the plurality groups of transmission parameters by a CORESET group index (CORESETPoolIndex) of the CORESET where the DCI that schedules the PUSCH is located.

Further, in Example 2, the target transmission parameter is determined from the plurality groups of transmission parameters based on the CORESET group index and a first corresponding relationship, where the first corresponding relationship is a corresponding relationship between a value of the CORESET group index and the transmission parameter group ID.

Optionally, the CORESET group index may occupy N bits, where N is an integer greater than or equal to 1. For example, in the case of N=1, the CORESET group index may take values of 0 and 1. For another example, in the case of N=2, the values of the CORESET group index may be 00, 01, 10, and 11. For another example, in the case of N=3, the values of the CORESET group index may be 000, 001, 010, 011, 100, 101, 110, and 111.

Optionally, in the case of N=1, if the CORESET group index is 0, the target transmission parameter is the first group of transmission parameters in the plurality groups of transmission parameters; if the CORESET group index is 1, the target transmission parameter is the second group of transmission parameters in the plurality groups of transmission parameters.

Optionally, in the case of N=2, if the CORESET group index is 00, the target transmission parameter is the first group of transmission parameters in the plurality groups of transmission parameters; if the CORESET group index is 01, the target transmission parameter is the second group of transmission parameters in the plurality groups of transmission parameters.

For example, the network device may configure one CORESET group index (CORESETPoolIndex) for each CORESET in advance, and different CORESETs may use the same CORESET group index, or may use different CORESET group indexes. Particularly, in the case that the CORESET group index occupies 1 bit, if one CORESET is not configured with a CORESET group index, the terminal device may assume that the value of the CORESET group index of the CORESET is 0. When the terminal device detects the PDCCH carrying the DCI that schedules the PUSCH in a first CORESET, the terminal device determines the target transmission parameter from the plurality groups of transmission parameters according to the CORESET group index of the first CORESET. For example, in the case that the CORESET group index occupies 1 bit, it is assumed that the PUCCH resource is configured with two groups of transmission parameters. If the value of the CORESET group index of the first CORESET is 0 or the first CORESET is not configured with a CORESET group index, then the first group of transmission parameters in the two groups of transmission parameters is used as the transmission parameter of the PUSCH; if the value of the CORESET group index of the first CORESET is 1, the second group of transmission parameters in the two groups of transmission parameters is used as the transmission parameter of the PUSCH.

Optionally, this method may also be used in the case where the PUCCH resource is configured with more than two groups of transmission parameters.

Therefore, in Example 2, in the case that the PUCCH diversity transmission based on multi-TRP is used in the uplink BWP activated on the carrier where the PUSCH is located, the terminal device may use the transmission parameter of the PUCCH in the diversity transmission of PUCCH that is the same as the PUSCH receiving TRP as the transmission parameter of PUSCH, so as to ensure that different channels sent to the same TRP use the same transmission parameter.

Example 3: the terminal device determines the transmission parameter of the PUSCH according to the number of transmission parameters configured in the PUCCH resource with the lowest resource identifier in the uplink BWP activated on the carrier where the PUSCH is located.

For example, three PUCCH resources are configured in the activated uplink BWP on the carrier where the PUSCH is located, which are denoted as PUCCH resource 0, PUCCH resource 1 and PUCCH resource 2 respectively. In this case, the terminal device may determine the transmission parameter of the PUSCH according to the number of the transmission parameters configured by PUCCH resource 0.

Optionally, in Example 3, if the number of the transmission parameters is equal to 1, the terminal device determines the transmission parameter configured by the PUCCH resource with the lowest resource identifier in the uplink BWP as the transmission parameter of the PUSCH.

If the number of the transmission parameters is greater than 1, the terminal device obtains the transmission parameter of the PUSCH from the QCL assumption used by a target CORESET, where the target CORESET is the CORESET with the lowest CORESET identifier configured on the downlink BWP activated on the carrier where the PUSCH is located.

For example, three CORESETs are configured on the downlink BWP activated on the carrier where the PUSCH is located, namely CORESET 0, CORESET 1 and CORESET 2, then the CORESET with the lowest CORESET ID is CORESET 0, that is, the target CORESET is CORESET 0.

It should be noted that the network device may configure one CORESET identifier for each CORESET in advance, and the CORESET identifiers of different CORESETs are different, which are used to identify the CORESETs. For example, when the transmission parameter is the reference signal used for path loss measurement, the terminal device uses the downlink reference signal corresponding to the QCL assumption (QCL type is QCL type-D) used by the target CORESET as the reference signal used for the path loss measurement of the PUSCH. For another example, when the transmission parameter is a sending beam, the terminal device uses the receiving beam of the downlink reference signal corresponding to the QCL assumption (QCL type is QCL type-D) used by the target CORESET as the sending beam of the PUSCH.

Optionally, in Example 3, if the number of the transmission parameters is equal to 1, the terminal device determines the transmission parameter configured by the PUCCH resource with the lowest resource identifier in the uplink BWP as the transmission parameter of the PUSCH;

if the number of the transmission parameters is greater than 1, the terminal device obtains the transmission parameter of the PUSCH from the QCL assumption used by a target CORESET, where the target CORESET is the CORESET where the DCI that schedules the PUSCH is located.

For example, if the terminal device detects in CORESET 1 the PDCCH carrying the DCI that schedules the PUSCH, it obtains the transmission parameter of the PUSCH from the QCL assumption used in CORESET 1. For example, when the transmission parameter is the reference signal used for path loss measurement, the terminal device uses the downlink reference signal corresponding to the QCL assumption (QCL type is QCL type-D) used by CORESET 1 as the reference signal used for the path loss measurement of the PUSCH. For another example, when the transmission parameter is a sending beam, the terminal device uses the receiving beam of the downlink reference signal corresponding to the QCL assumption (QCL type is QCL type-D) used by CORESET 1 as the sending beam of the PUSCH.

Optionally, in Example 3, if the number of the transmission parameters is equal to 1, the terminal device determines the transmission parameter configured by the PUCCH resource with the lowest resource identifier in the uplink BWP as the transmission parameter of the PUSCH;

If the number of the transmission parameters is greater than 1, the terminal device obtains the transmission parameter of the PUSCH from a target TCI state, where the target TCI state is a TCI state with the lowest TCI state identifier among the TCI states activated for PDSCH transmission in the downlink BWP activated on the carrier where the PUSCH is located.

For example, the downlink BWP activated on the carrier where the PUSCH is located is configured with five TCI states, namely TCI state 0, TCI state 1, TCI state 2, TCI state 3, and TCI state 4. The TCI states with activated state for PDSCH transmission include: TCI state 2, TCI state 3 and TCI state 4. Then, among the TCI states activated for PDSCH transmission in the downlink BWP activated on the carrier where the PUSCH is located, the TCI state with the lowest TCI state identifier is TCI state 2, that is, the target TCI state is TCI state 2.

It should be noted that the network device activates the TCI states for PDSCH transmission through a Media Access Control Control Element (MAC CE) in advance.

For example, when the transmission parameter is the reference signal used for path loss measurement, the terminal device uses the downlink reference signal (QCL type is QCL type-D) included in the TCI state with the lowest TCI state identifier among the TCI states activated for PDSCH transmission in the downlink BWP activated on the carrier where the PUSCH is located, as the reference signal for path loss measurement of PUSCH. For another example, when the transmission parameter is the sending beam, the terminal device uses the receiving beam of the downlink reference signal (QCL type is QCL type-D) included in the TCI state with the lowest TCI state identifier among the TCI states activated for PDSCH transmission in the downlink BWP activated on the carrier where the PUSCH is located, as the sending beam of PUSCH; or, the terminal device uses the sending beam of the uplink reference signal included in the TCI state with the lowest TCI state identifier among the TCI states activated for PDSCH transmission in the downlink BWP activated on the carrier where the PUSCH is located, as the sending beam of the PUSCH.

Therefore, in Example 3, the terminal device may use different methods to determine the transmission parameter of the PUSCH according to the number of transmission parameters configured for the PUCCH resource with the lowest resource identifier in the uplink BWP activated on the carrier where the PUSCH is located, that is, according to whether the PUCCH resource performs multi-TRP-based PUCCH diversity transmission, thereby simultaneously supporting two scenarios of single-TRP PUCCH transmission and multi-TRP cooperative PUCCH diversity transmission.

Optionally, in the embodiments of the present application, CORESETs configured with different CORESET group indexes may come from different TRPs. For example, the CORESET configured with CORESET group index 0 is transmitted from TRP 0, and the CORESET configured with CORESET group index 1 is transmitted from TRP 1.

Optionally, in some embodiments, the terminal device transmits the PUSCH according to the determined transmission parameter of the PUSCH.

For example, after determining the sending beam of the PUSCH, the terminal device may use the sending beam to send the PUSCH.

For example, after determining the reference signal used for the path loss measurement of the PUSCH, the terminal device may use the reference signal to perform path loss measurement, and calculate the transmit power of the PUSCH according to the measured path loss value.

Therefore, in the embodiments of the present application, in the case where the PUCCH resource with the lowest resource identifier in the uplink BWP activated on the carrier where the PUSCH is located is configured with multiple spatial relation information, the terminal device may determine the transmission parameter of the PUSCH scheduled by DCI format 0_0. Alternatively, in the case where the multi-TRP-based PUCCH diversity transmission is used in the uplink BWP activated on the carrier where the PUSCH is located, the terminal device may determine the transmission parameter of the PUSCH scheduled by the DCI format 0_0. Further, the terminal device may select other PUCCH resources that are not configured with multiple spatial relation information to obtain the transmission parameter of the PUSCH, or use the transmission parameter of the PUCCH sent to the same TRP as the transmission parameter of the PUSCH, or obtain from the QCL assumption of the downlink signal the transmission parameter of the PUSCH, so that the problem that the PUSCH transmission parameter cannot be determined can be solved without signaling.

The method embodiments of the present application are described in detail above with reference to FIGS. 5 to 6, and the apparatus embodiments of the present application are described in detail below with reference to FIGS. 7 to 10. It should be understood that the apparatus embodiments and the method embodiments correspond to each other, and for the similar description, the method embodiments may be referred to.

Figure 7:
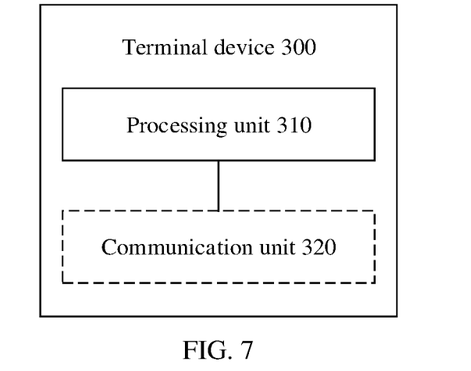
FIG. 7 is a schematic block diagram of a terminal device provided according to an embodiment of the present application.

FIG. 7 shows a schematic block diagram of a terminal device 300 according to an embodiment of the present application. As shown in FIG. 7, the terminal device 300 includes:

a processing unit 310, configured to determine a transmission parameter of a PUSCH according to a transmission parameter on a PUCCH resource in an uplink BWP activated on a carrier where the PUSCH is located, where the PUSCH is a PUSCH scheduled in a first DCI format, and the transmission parameter is a sending beam and/or the transmission parameter is a reference signal used for path loss measurement.

Optionally, the processing unit 310 is specifically configured to:
determine a transmission parameter on the PUCCH resource with the lowest resource identifier among the PUCCH resources configured with only one group of transmission parameters in the uplink BWP as the transmission parameter of the PUSCH.

Optionally, the processing unit 310 is specifically configured to:
if the PUCCH resource with the lowest resource identifier in the uplink BWP is configured with a plurality groups of transmission parameters, determine a target transmission parameter in the plurality groups of transmission parameters as the transmission parameter of the PUSCH.

Optionally, the target transmission parameter is one pre-agreed group of transmission parameters in the plurality groups of transmission parameters, or the target transmission parameter is one pre-configured group of transmission parameters in the plurality groups of transmission parameters, or the target transmission parameter is one group of transmission parameters indicated by a network device in the plurality groups of transmission parameters.

Optionally, the target transmission parameter is determined from the plurality groups of transmission parameters according to a CORESET group index of a CORESET where the DCI that schedules the PUSCH is located.

Optionally, the target transmission parameter is determined from the plurality groups of transmission parameters according to the CORESET group index and a first corresponding relationship, where the first corresponding relationship is a corresponding relationship between values of the CORESET group index and the transmission parameter group identifiers.

Optionally, if the value of the CORESET group index is 0, the target transmission parameter is the first group of transmission parameters in the plurality groups of transmission parameters; if the value of the CORESET group index is 1, the target transmission parameter is the second group of transmission parameters in the plurality groups of transmission parameters.

Optionally, the processing unit 310 is specifically configured to:
determine the transmission parameter of the PUSCH according to the number of transmission parameters configured for the PUCCH resource with the lowest resource identifier in the uplink BWP.

Optionally, the processing unit 310 is specifically configured to:
if the number of the transmission parameters is equal to 1, determine the transmission parameter configured for the PUCCH resource with the lowest resource identifier in the uplink BWP as the transmission parameter of the PUSCH;
if the number of transmission parameters is greater than 1, obtain the transmission parameter of the PUSCH from a quasi-co-located (QCL) assumption used by a target CORESET, where the target CORESET is a CORESET with the lowest CORESET identifier among CORESETs configured on a downlink BWP activated on the carrier where the PUSCH is located, or the target CORESET is a CORESET where the DCI that schedules the PUSCH is located.

Optionally, the processing unit 310 is specifically configured to:
if the number of the transmission parameters is equal to 1, determine the transmission parameter configured for the PUCCH resource with the lowest resource identifier in the uplink BWP as the transmission parameter of the PUSCH;
if the number of the transmission parameters is greater than 1, obtain the transmission parameter of the PUSCH from a target transmission configuration indicator (TCI) state, where the target TCI state is a TCI state with the lowest TCI state identifier among the TCI states activated for the physical downlink sharing channel (PDSCH) transmission in the downlink BWP activated on the carrier where the PUSCH is located.

Optionally, the terminal device 300 further includes:
a communication unit 320, configured to transmit the PUSCH according to the determined transmission parameter of the PUSCH.

Optionally, the first DCI format is DCI format 0_0.

Optionally, in some embodiments, the above-mentioned communication unit may be a communication interface or a transceiver, or an input/output interface of a communication chip or a system-on-chip. The aforementioned processing unit may be one or more processors.

It should be understood that the terminal device 300 according to the embodiments of the present application may correspond to the terminal device in the method embodiments of the present application, and the above-mentioned and other operations and/or functions of the various units in the terminal device 300 are respectively for realizing the corresponding process of the terminal device in the method 200 shown in FIG. 5, which are not repeated here for brevity.

Figure 8:
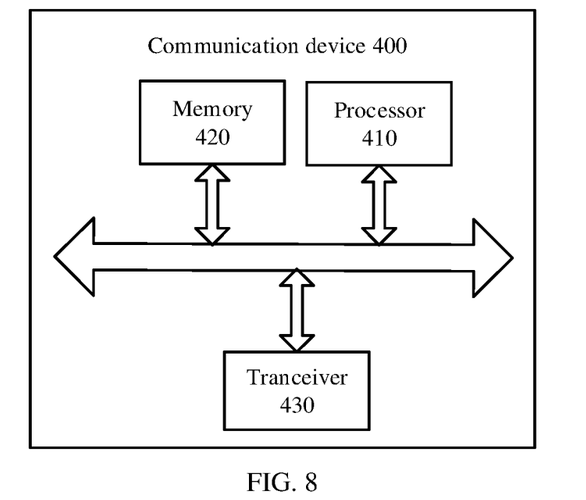
FIG. 8 is a schematic block diagram of a communication device provided according to an embodiment of the present application.

FIG. 8 is a schematic structural diagram of a communication device 400 provided by an embodiment of the present application. The communication device 400 shown in FIG. 8 includes a processor 410, and the processor 410 may call and run a computer program from a memory, so as to implement the method in the embodiments of the present application.

Optionally, as shown in FIG. 8, the communication device 400 may further include a memory 420. The processor 410 may call and run a computer program from the memory 420 to implement the methods in the embodiments of the present application.

The memory 420 may be a separate device independent of the processor 410, or may be integrated in the processor 410.

Optionally, as shown in FIG. 8, the communication device 400 may further include a transceiver 430, and the processor 410 may control the transceiver 430 to communicate with other devices, specifically, may send information or data to other devices, or receive information or data sent by other device.

Among them, the transceiver 430 may include a transmitter and a receiver. The transceiver 430 may further include antennas, and the number of the antennas may be one or more.

Optionally, the communication device 400 may specifically be the network device in the embodiments of the present application, and the communication device 400 may implement the corresponding processes implemented by the network device in each method in the embodiments of the present application. For the sake of brevity, details are not repeated here.

Optionally, the communication device 400 may specifically be the mobile terminal/terminal device in the embodiments of the present application, and the communication device 400 may implement the corresponding processes implemented by the mobile terminal/terminal device in each method of the embodiments of the present application. For the sake of brevity, details are not repeated here.

Figure 9:
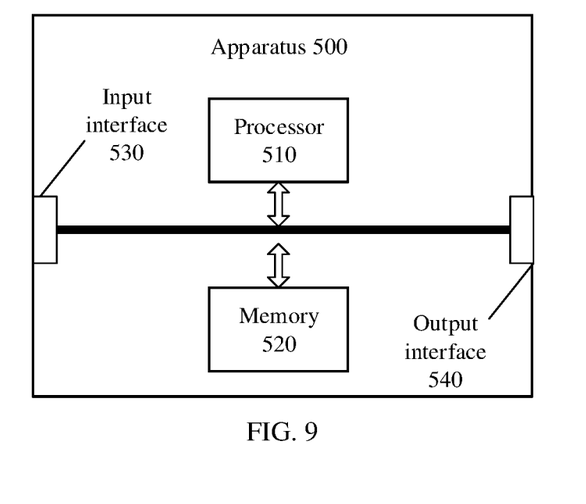
FIG. 9 is a schematic block diagram of an apparatus provided according to an embodiment of the present application.

FIG. 9 is a schematic structural diagram of an apparatus according to an embodiment of the present application. The apparatus 500 shown in FIG. 9 includes a processor 510, and the processor 510 may call and run a computer program from a memory, so as to implement the methods in the embodiments of the present application.

Optionally, as shown in FIG. 9, the apparatus 500 may further include a memory 520. The processor 510 may call and run a computer program from the memory 520 to implement the methods in the embodiments of the present application.

The memory 520 may be a separate device independent of the processor 510, or may be integrated in the processor 510.

Optionally, the apparatus 500 may further include an input interface 530. The processor 510 may control the input interface 530 to communicate with other devices or chips, and specifically, may acquire information or data sent by other devices or chips.

Optionally, the apparatus 500 may further include an output interface 540. The processor 510 may control the output interface 540 to communicate with other devices or chips, and specifically, may output information or data to other devices or chips.

Optionally, the apparatus may be applied to the network device in the embodiments of the present application, and the apparatus may implement the corresponding processes implemented by the network device in the each method of the embodiments of the present application, which are not repeated here for brevity.

Optionally, the apparatus may be applied to the mobile terminal/terminal device in the embodiments of the present application, and the apparatus may implement the corresponding processes implemented by the mobile terminal/terminal device in each method of the embodiments of the present application, which are not repeated here for brevity.

Optionally, the apparatus mentioned in the embodiments of the present application may also be a chip. For example, it may be a system level chip, a system chip, a chip system, or a system-on-chip.

Figure 10:
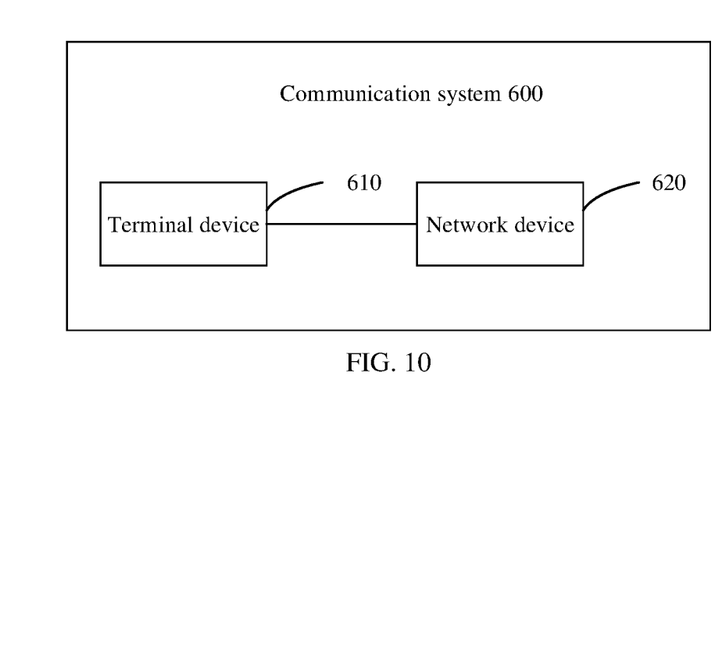
FIG. 10 is a schematic block diagram of a communication system provided according to an embodiment of the present application.

FIG. 10 is a schematic block diagram of a communication system 600 provided by an embodiment of the present application. As shown in FIG. 10, the communication system 600 includes a terminal device 610 and a network device 620.

The terminal device 610 may be used to implement the corresponding functions implemented by the terminal device in the above methods, and the network device 620 may be used to implement the corresponding functions implemented by the network device in the above methods. For brevity, details are not repeated here.

It should be understood that the processor in the embodiments of the present application may be an integrated circuit chip, which has a signal processing capability. In the implementation process, each step of the above method embodiments may be completed by a hardware integrated logic circuit in a processor or an instruction in the form of software. The above-mentioned processor may be a general-purpose processor, a Digital Signal Processor (DSP), an Application Specific Integrated Circuit (ASIC), a Field Programmable Gate Array (FPGA) or other programmable logic devices, discrete gate or transistor logic devices, discrete hardware components. The methods, steps, and logic block diagrams disclosed in the embodiments of the present application can be implemented or executed. The general-purpose processor may be a microprocessor or the processor may be any conventional processor or the like. The steps of the method disclosed in conjunction with the embodiments of the present application may be directly embodied as executed by a hardware decoding processor, or executed by a combination of hardware and software modules in the decoding processor. The software modules may be located in a random access memory, a flash memory, a read-only memory, a programmable read-only memory or an electrically erasable programmable memory, a register and other storage media mature in the art. The storage medium is located in the memory, and the processor reads the information in the memory, and completes the steps of the above methods in combination with its hardware.

It may be understood that the memory in the embodiments of the present application may be a volatile memory or a non-volatile memory, or may include both volatile and non-volatile memories. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM), which acts as an external cache. By way of illustration and not limitation, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memory of the systems and methods described herein is intended to include, but not be limited to, these and any other suitable types of memory.

It should be understood that the above memory is an example but not a limitative description, for example, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ES-DRAM), a synch link DRAM (SLDRAM) and a Direct Rambus RAM (DR RAM) and so on. That is, the memory in the embodiments of the present application is intended to include but not limited to these and any other suitable types of memory.

Embodiments of the present application further provide a computer-readable storage medium for storing a computer program.

Optionally, the computer-readable storage medium may be applied to the mobile terminal/terminal device in the embodiments of the present application, and the computer program enables the computer to execute the corresponding processes implemented by the mobile terminal/terminal device in each method of the embodiments of the present application, which are not repeated here for brevity.

Optionally, the computer program product may be applied to the mobile terminal/terminal device in the embodiments of the present application, and the computer program instructions cause the computer to execute the corresponding processes implemented by the mobile terminal/terminal device in each method of the embodiments of the present application, which are not repeated here for brevity.

The embodiments of the present application also provide a computer program.

Optionally, the computer program may be applied to the mobile terminal/terminal device in the embodiments of the present application, and when the computer program is run on the computer, the computer executes the corresponding process implemented by the mobile terminal/terminal device in the various methods of the computer program in the embodiments of the present application, which are not repeated here for brevity.

Those of ordinary skill in the art can realize that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Professional technicians may implement the described functionality using different methods for each particular application, but such implementations should not be considered beyond the scope of the present application.

Those skilled in the art can clearly understand that, for the convenience and brevity of description, the specific working process of the above-described systems, apparatuses and units may refer to the corresponding processes in the foregoing method embodiments, which will not be repeated here.

In the several embodiments provided in the present application, it should be understood that the disclosed system, apparatus and method may be implemented in other manners. For example, the apparatus embodiments described above are only illustrative. For example, the division of the units is only a logical function division. In actual implementation, there may be other division methods. For example, a plurality of units or components may be combined or may be integrated into another system, or some features may be ignored, or not implemented. On the other hand, the shown or discussed mutual coupling or direct coupling or communication connection may be indirect coupling or communication connection through some interfaces, apparatuses or units, and may be in electrical, mechanical or other forms.

The units described as separate components may or may not be physically separated, and components displayed as units may or may not be physical units, that is, may be located in one place, or may be distributed to a plurality of network units. Some or all of the units may be selected according to actual needs to achieve the purpose of the solution in this embodiment.

In addition, each functional unit in each embodiment of the present application may be integrated into one processing unit, or each unit may exist physically alone, or two or more units may be integrated into one unit.

The functions, if implemented in the form of software functional units and sold or used as independent products, may be stored in a computer-readable storage medium. For such understanding, the essence of the technical solution or the part that contributes to the related art or the part of the technical solution of the present application can be embodied in the form of a software product. The computer software product is stored in a storage medium, including several instructions to cause a computer device (which may be a personal computer, a server, or a network device, etc.) to execute all or part of the steps of the methods described in the various embodiments of the present application. The aforementioned storage medium includes: a U disk, a mobile hard disk, a Read-Only Memory (ROM), a Random Access Memory (RAM), a magnetic disk or an optical disk and other media that can store program codes.

The above are only specific embodiments of the present application, but the protection scope of the present application is not limited thereto. Any person skilled in the technical field can easily think of changes or replacements within the technical scope disclosed in the present application, which should be covered in the protection scope of the present application. Therefore, the protection scope of the present application shall be subject to the protection scope of claims.

What is claimed is:

1. A method for determining an uplink transmission parameter, comprising:

determining, by a terminal device, a transmission parameter of a physical uplink shared channel (PUSCH) according to a transmission parameter on a physical uplink control channel (PUCCH) resource in an uplink bandwidth part (BWP) activated on a carrier where the PUSCH is located, wherein the PUSCH is a PUSCH scheduled by using a first downlink control information (DCI) format, and the transmission parameter is a sending beam and/or the transmission parameter is a reference signal used for path loss measurement;

wherein the determining, by the terminal device, the transmission parameter of the PUSCH according to the transmission parameter on the PUCCH resource in the uplink BWP activated on the carrier where the PUSCH is located, comprises:

in response to that a PUCCH resource with a lowest resource identifier in the uplink BWP is configured with two groups of transmission parameters, and the two groups of transmission parameters are respectively used for odd-numbered PUCCH repeated transmissions and even-numbered PUCCH repeated transmissions, determining, by the terminal device, a first group of transmission parameters as the transmission parameter of the PUSCH, wherein the first group of transmission parameters is a group of transmission parameters used for transmitting the odd-numbered PUCCH repeated transmissions.

2. The method according to claim 1, wherein the first DCI format is DCI format 0_0.

3. The method according to claim 1, wherein the PUCCH resource with the lowest resource identifier in the uplink BWP is configured with two pieces of PUCCH spatial relation information, which are respectively used for the odd-numbered PUCCH repeated transmissions and the even-numbered PUCCH repeated transmissions.

4. The method according to claim 1, wherein determining, by the terminal device, the first group of transmission parameters as the transmission parameter of the PUSCH comprises:
determining PUCCH spatial relation information first determined by the terminal device, as the sending beam of the PUSCH.

5. The method according to claim 1, wherein determining, by the terminal device, the first group of transmission parameters as the transmission parameter of the PUSCH comprises:
determining a path loss measurement reference signal indicated by first PUCCH spatial relation information first determined by the terminal device, as the reference signal used for path loss measurement of the PUSCH.

6. The method according to claim 1, further comprising:
obtaining the sending beam and the reference signal used for the path loss measurement of the PUCCH resource through spatial relation information or through a TCI state.

7. A terminal device, comprising:
a processor and a memory, wherein the memory is configured to store a computer program, the processor is configured to call and run the computer program stored in the memory, to: determine a transmission parameter of a physical uplink shared channel (PUSCH) according to a transmission parameter on a physical uplink control channel (PUCCH) resource in an uplink bandwidth part (BWP) activated on a carrier where the PUSCH is located, wherein the PUSCH is a PUSCH scheduled by using a first downlink control information (DCI) format, and the transmission parameter is a sending beam and/or the transmission parameter is a reference signal used for path loss measurement;
wherein the processor is further configured to:
in response to that a PUCCH resource with a lowest resource identifier in the uplink BWP is configured with two groups of transmission parameters, and the two groups of transmission parameters are respectively used for odd-numbered PUCCH repeated transmissions and even-numbered PUCCH repeated transmissions, determine a first group of transmission parameters as the transmission parameter of the PUSCH, wherein the first group of transmission parameters is a group of transmission parameters used for transmitting the odd-numbered PUCCH repeated transmissions.

8. The terminal device according to claim 7, wherein the first DCI format is DCI format 0_0.

9. The terminal device according to claim 7, wherein the PUCCH resource with the lowest resource identifier in the uplink BWP is configured with two pieces of PUCCH spatial relation information, which are respectively used for the odd-numbered PUCCH repeated transmissions and the even-numbered PUCCH repeated transmissions.

10. The terminal device according to claim 7, wherein the processor is further configured to:
determine PUCCH spatial relation information first determined by the terminal device, as the sending beam of the PUSCH.

11. The terminal device according to claim 7, wherein the processor is further configured to:
determine a path loss measurement reference signal indicated by PUCCH spatial relation information first determined by the terminal device, as the reference signal used for path loss measurement of the PUSCH.

12. The terminal device according to claim 7, wherein the processor is further configured to:
obtain the sending beam and the reference signal used for the path loss measurement of the PUCCH resource through spatial relation information or through a TCI state.

13. A chip, comprising: a processor for calling and running a computer program from a memory, so that a device installed with the chip executes:
determining a transmission parameter of a physical uplink shared channel (PUSCH) according to a transmission parameter on a physical uplink control channel (PUCCH) resource in an uplink bandwidth part (BWP) activated on a carrier where the PUSCH is located, wherein the PUSCH is a PUSCH scheduled by using a first downlink control information (DCI) format, and the transmission parameter is a sending beam and/or the transmission parameter is a reference signal used for path loss measurement;
wherein the device installed with the chip further executes:
in response to that a PUCCH resource with a lowest resource identifier in the uplink BWP is configured with two groups of transmission parameters, and the two groups of transmission parameters are respectively used for odd-numbered PUCCH repeated transmissions and even-numbered PUCCH repeated transmissions, determining a first group of transmission parameters as the transmission parameter of the PUSCH, wherein the first group of transmission parameters is a group of transmission parameters used for transmitting the odd-numbered PUCCH repeated transmissions.

14. The chip according to claim 13, wherein the first DCI format is DCI format 0_0.

15. The chip according to claim 13, wherein the PUCCH resource with the lowest resource identifier in the uplink BWP is configured with two pieces of PUCCH spatial relation information, which are respectively used for the odd-numbered PUCCH repeated transmissions and the even-numbered PUCCH repeated transmissions.

16. The chip according to claim 13, wherein the device installed with the chip further executes:
determining PUCCH spatial relation information first determined by the device, as the sending beam of the PUSCH.

17. The chip according to claim 13, wherein the device installed with the chip further executes:
determining a path loss measurement reference signal indicated by PUCCH spatial relation information first determined by the device, as the reference signal used for path loss measurement of the PUSCH.

18. The chip according to claim 13, wherein the device installed with the chip further executes:
obtaining the sending beam and the reference signal used for the path loss measurement of the PUCCH resource through spatial relation information or through a TCI state.

* * * * *